Patented Oct. 30, 1934

1,978,481

UNITED STATES PATENT OFFICE 1,978,481

METHOD OF MOLDING

Douglas Frank Twiss and Edward Arthur Murphy, Wylde Green, Sutton Coldfield, England, assignors to Dunlop Rubber Company Limited, London, England, a British company No Drawing. Application August 10, 1932, Serial No. 628,183. In Great Britain September 19, 1931

1 Claim. (Cl. 18—58)

This invention is concerned with a method for the production of articles of or containing organic materials of the kinds hereinafter specified provided with a given surface finish.

The object of the present invention is to produce articles of or containing organic materials of the kinds hereinafter specified having a given surface finish of the types shown by various kinds of leathers, skins, and such like materials.

According to the present invention, the method for the provision of articles of or containing rubber or other organic substances provided with a surface of the type shown by various kinds of leather, skin, or such like material, comprises employing any particular leather, skin, or such like object having the particular surface finish desired as a former, mold or molding surface, or more particularly, employing replicas of the aforesaid object produced on, for instance, ceramics, metal or even rubber as formers, molds or molding surfaces by contact either of such acting formers, molds or molding surfaces with aqueous emulsions or dispersions or solutions in organic solvents of organic materials of the kinds hereinafter specified by any one or more of such operations as dipping, spreading, spraying, molding or electrophoresis.

It is often desirable to be able to reproduce on rubber surfaces effects resembling any particular type of leather or skin or like surface, as for instance, the wave markings on certain leathers such as crocodile or alligator leather.

These effects are, however, characteristic of the leather surfaces. Thus it has heretofore not been possible to employ satisfactorily suitably surfaced ceramic or metallic molds for the production of rubber articles having the desired surface finish.

An object of our invention is to provide a method whereby articles may be easily formed in faithful and exact duplication of a natural surface.

In our invention a mass of rubber or rubber dispersion is molded directly on the leather, or other natural surface, so as to fit in complementary fashion into the surface details thereof and form an exact duplicate. Or, this surface or one of the materials thus molded or formed may be used as replicas on which to mold or form the rubber articles directly from the dispersion.

In carrying out the present invention it may be necessary to distend suitably, support or otherwise make rigid the leather, or the like articles, the surface of which it is desired to reproduce. The rigidity may be effected by introducing, for instance, air or other fluid, or by the use of powdery substances, as for instance, soapstone, unbaked clay, sulphur alone or in a mixture with other materials or suitable waxes.

In certain cases it may be merely necessary to attach the leather or the like article having the particular surface to be reproduced to a rigid surface backing, as for instance, by adhesion.

For instance, in the reproduction of surfaces from thin leather or the like articles having the desired markings on their surfaces, these articles can be turned inside out and the inside filled with, for instance, plaster of Paris. A casting is then made from this plaster of Paris replica, and this casting is then used for obtaining further formers, as for instance, in metal or ceramic material. It will be seen that if the original surface effect is considered as positive, the replica obtained on the plaster of Paris from the original surface is negative; the casting of this will be positive and formers made from this casting will again be negative. Therefore, formers used for producing rubber articles from aqueous dispersions or solutions will give a positive surface on the aforesaid rubber articles resembling the original surface effect on the leather or the like.

It is to be understood that articles of or containing rubber or other organic substances made directly on the original selected leather or like material obtain a surface finish which is not a true reproduction but only a reproduction in inverted form or mirror-fashion.

Usually it is of small importance whether a true reproduction or only a reproduction in inverted form or mirror-fashion is obtained. This being so, it may often not be necessary or desirable to turn inside out a thin leather or the like article having the desired markings on their surfaces in order to produce a casting. If desired, formers may be made from the original leather or like material having a positive surface so that such formers used for producing rubber articles from aqueous dispersions or solutions of rubber or the like will give a negative surface on the aforesaid rubber articles.

The dispersions comprise those consisting of or containing rubber, gutta-percha, balata or similar vegetable resins, occurring naturally or artificially obtained and in vulcanized or unvulcanized condition.

Aqueous dispersions of artificial rubber, coagulated rubber, vulcanized rubber, waste or reclaim, may also be employed, if desired, as alternatives or admixtures.

Any of the aforesaid dispersions may contain the usual known compounding ingredients and/or may be in concentrated form. Concentrates such as are obtained in Patent 1,846,164, in which may be incorporated any one or more of the usual compounding ingredients, may also be used.

Any of the aforesaid aqueous dispersions can also be such as are or can be rendered capable of gelling on the application of heat, or substances can be added to cause the aqueous emulsions or dispersions to gel in the cold after a definite and controllable time interval.

What we claim is:

A method of forming a shaped hollow rubber article of rubber having a surface finish in exact replica of a selected natural leather surface, which comprises turning inside out an article of the selected leather surface to be reproduced, filling the interior of the inverted article with a plastic material to receive an exact negative replica of the surface of said leather, and molding rubber from a negative replica formed in this manner by depositing rubber on the surface thereof from an aqueous dispersion of rubber material.

DOUGLAS FRANK TWISS.
EDWARD ARTHUR MURPHY.